United States Patent [19]

Auld, Jr. et al.

[11] Patent Number: 5,491,748
[45] Date of Patent: Feb. 13, 1996

[54] ENHANCED SECURITY FOR A CABLE SYSTEM

[75] Inventors: Frederick H. Auld, Jr., Barrington; Michael E. Long, Oakbrook, both of Ill.

[73] Assignee: Zenith Electronics Corporation, Glenview, Ill.

[21] Appl. No.: 203,955

[22] Filed: Mar. 1, 1994

[51] Int. Cl.⁶ .................................................. H04N 7/167
[52] U.S. Cl. .................................. 380/15; 380/17; 380/20
[58] Field of Search .................................. 380/15, 17, 20

[56] References Cited

U.S. PATENT DOCUMENTS

| | | | |
|---|---|---|---|
| 3,885,089 | 5/1975 | Callais et al. | 380/20 X |
| 4,514,761 | 4/1985 | Merrell et al. | 380/20 |
| 4,590,519 | 5/1986 | Zelenz | 380/15 |
| 4,611,242 | 9/1986 | Williams | 380/20 |
| 4,716,588 | 12/1987 | Thompson et al. | 380/20 |
| 4,723,283 | 2/1988 | Nagasawa et al. | 380/20 |
| 5,113,441 | 5/1992 | Harada | 380/15 |
| 5,125,028 | 6/1992 | Naito | 380/20 |
| 5,231,664 | 7/1993 | Bestler et al. | 380/20 |

*Primary Examiner*—David C. Cain

[57] ABSTRACT

A cable television plant scrambling system incorporates video inversion with a pair of mode signals included in the vertical blanking interval of a scrambled television signal for identifying the proper mode for a video inverting/non-inverting amplifier at a subscriber station. An encoded mode control signal in the form of a byte of data is sent periodically with the scrambled television signal for selecting which of the mode signals is operative. In the receiver, the mode signals are applied to the inverting/non-inverting video amplifier and the encoded mode control signal is supplied to a microprocessor which is provided with a decoding algorithm from the cable head-end. The microprocessor decodes the mode control signal and tells the inverting amplifier which mode signal to look to for proper operation. A new decoding algorithm is periodically downloaded to subscriber stations on an out-of-band basis to enable the encoded mode control signal to be changed.

8 Claims, 3 Drawing Sheets

5,491,748

ENHANCED SECURITY FOR A CABLE SYSTEM

BACKGROUND OF THE INVENTION AND PRIOR ART

This invention relates generally to security for cable television plant transmissions and particularly to an enhanced security system for a Zenith Z-TAC SSAVI (suppressed sync, audio, video inversion) scrambling system.

In early Z-TAC systems, a mode control signal in the form of a flag on a horizontal line in the vertical blanking interval (VBI) of the television signal indicates to the subscriber station decoder whether the following frame of video is to be inverted or not. A later version utilizes encrypted mode data on a horizontal line in the VBI (from which encrypted data is decoded by the decoder) for controlling the state of the subscriber station inverting amplifier. Security of a later version was improved because of the secrecy of the algorithm used for decoding of the mode data that controlled video inversion and the secrecy of the placement of a decoding key in the VBI data.

A still later version of the Z-TAC system employed an extension of in-band data in the VBI and an out-of-band data channel for extended features such as enhanced program tag capability, an electronic program guide, various dealer services, on screen display menus and the like. The out-of-band data channel also enables communications with subscriber station decoders in the cable system that are not tuned to a particular channel. The present invention utilizes the extended in-band data and the out-of-band data channel to further enhance the security of the video inversion of the Z-TAC system.

OBJECTS OF THE INVENTION

A principal object of the invention is to provide an improved cable television descrambling system.

Another object of the invention is to provide a highly secure video inversion scrambling control for a cable television system.

A further object of the invention is to provide a secure video inversion system for a cable television signal decoder that is readily changeable from the cable head-end.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
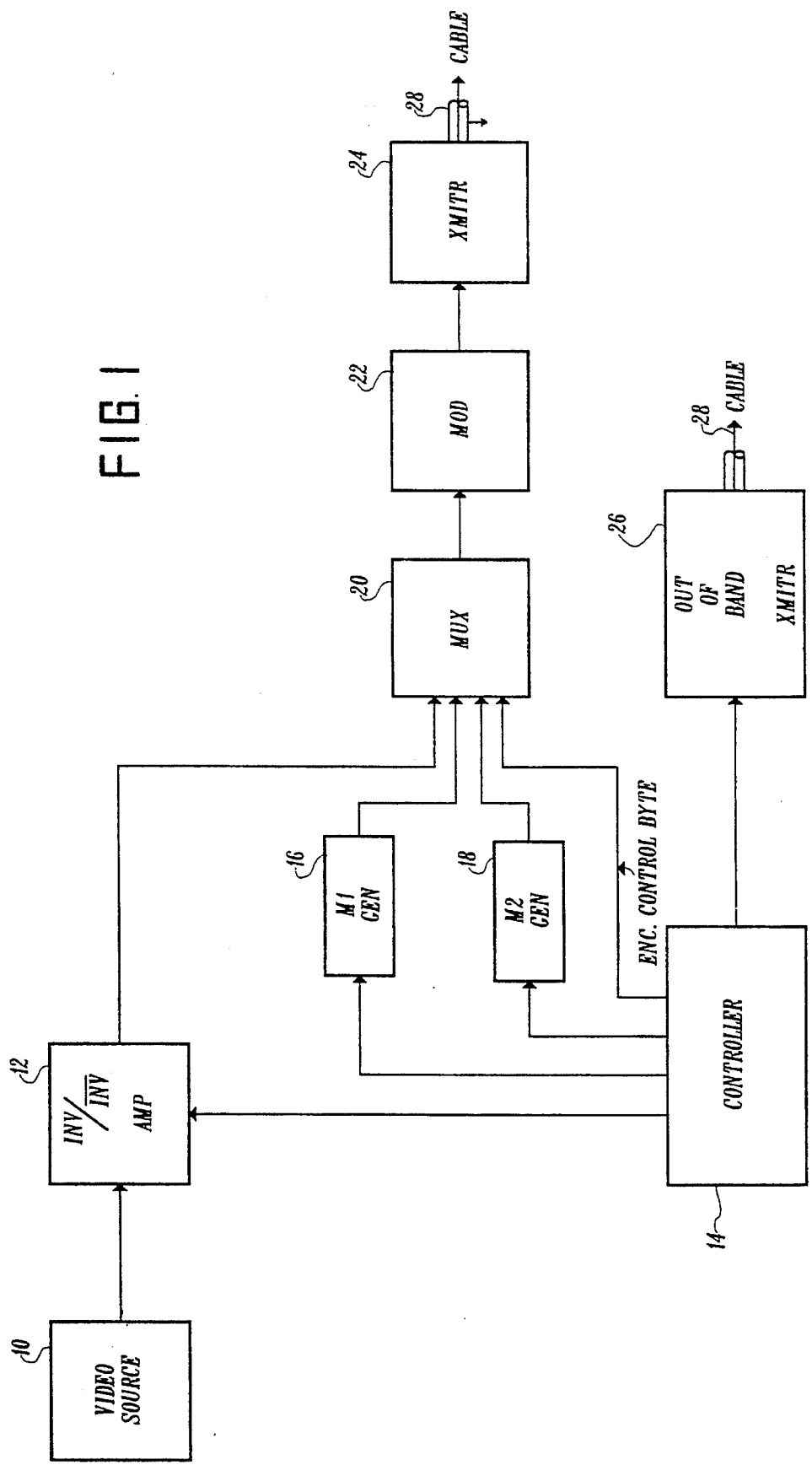
FIG. 1 is a simplified block diagram of a cable head-end transmitter cystructed in accordance with the invention.

In FIG. 1, a video source 10 supplies video information to an inverting/non-inverting amplifier 12 that is controlled by a controller 14. Thus whether the video from source 10 is inverted or not is dependent upon an appropriate signal from controller 14. Controller 14 controls the operation of a pair of mode signal generators 16 and 18 which produce respective mode signals M1 and M2 that inform the subscriber station decoder of the status of the video (i.e. whether the video is inverted or not inverted). Controller 14 also supplies a mode control signal in the form of an encoded control byte that tells the decoder in the subscriber station which of the mode signals M1 or M2 is effective or "true". The video signal from inverting/non-inverting amplifier 12, the two mode signals from mode control generators 16 and 18 and the encoded control byte signal are all supplied to a multiplexer 20. The latter three signals are sent in the VBI of the transmitted television signal. The output of multiplexer 20 is supplied to a modulator 22 which in turn supplies a transmitter 24 that delivers the scrambled (video) television signal (including the mode signals M1, M2 and encoded control byte in the VBI). This signal is provided via a cable 28 to the various subscriber stations in the television cable plant. Finally controller 14 also supplies a decoding algorithm for decoding the encoded mode control signal to an out-of-band transmitter 26 that is also coupled to cable 28. The out-of-band signals are supplied outside of the normal television channels sent on cable 28 whereas the mode signals and encoded mode control are sent in-band, i.e. in the VBI of a television signal.

Figure 2:
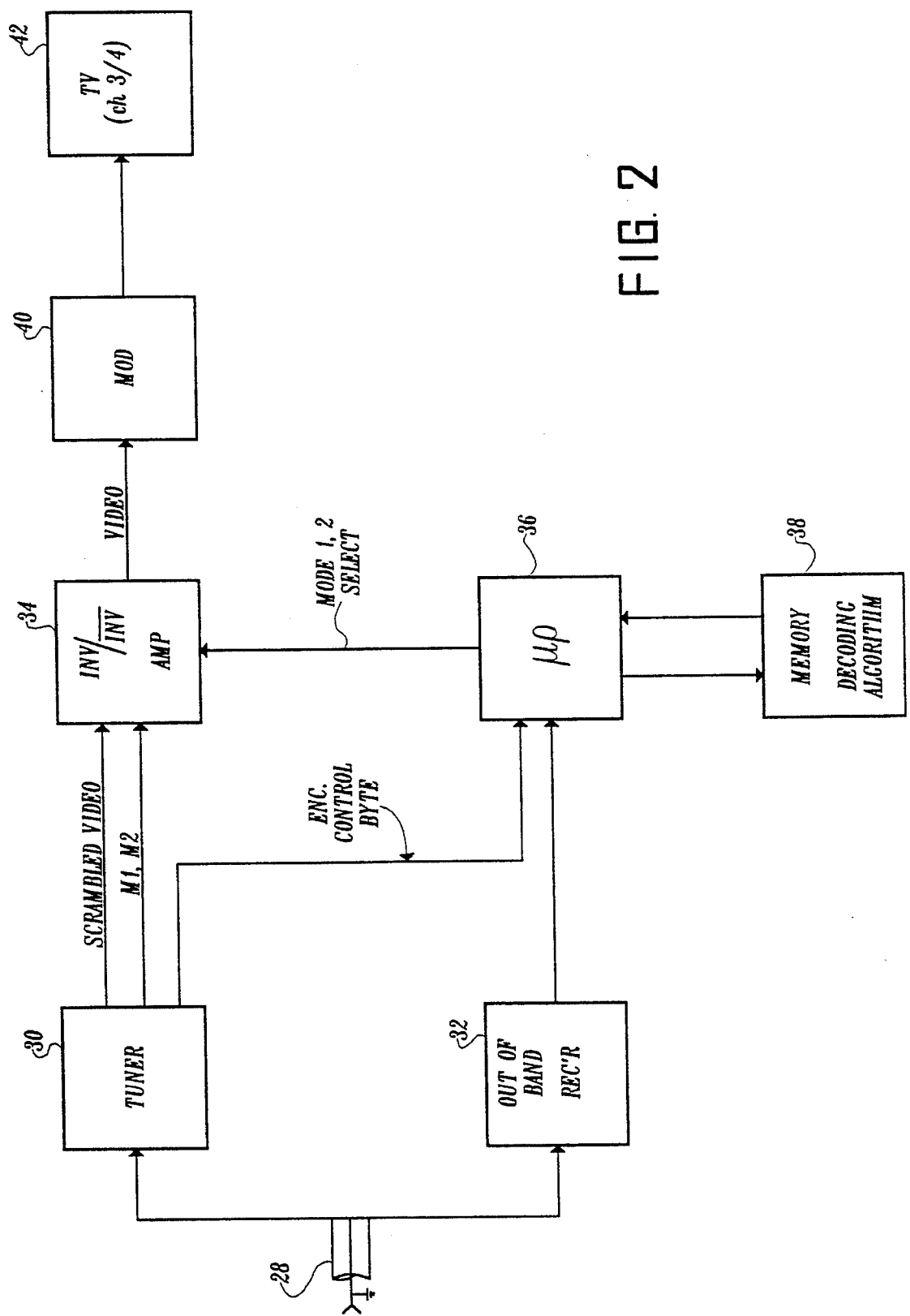
FIG. 2 is a simplified block diagram of a subscriber station receiver constructed in accordance with the invention.

The receiver in FIG. 2 includes a tuner 30 and an out-of-band receiver 32 that receives the signals from cable 28 and processes them accordingly, with tuner 30 processing in-band television channel signals and receiver 32 processing out-of-band signals. Tuner 30 includes means (not shown) for: conversion of the tuned RF channel to baseband video; detection of PAY TV conditional access control data; partial decoding of the Z-TAC scrambled program (sync restoration); and detecting the mode signals M1 and M2 and the encoded control byte. Tuner 30 supplies the video and the M1 and M2 signals to inverting amplifier 34 and the in-band encoded control byte to a microprocessor 36. The out-of-band receiver 32 supplies the decoding algorithm (when received) to microprocessor 36. Microprocessor 36 is shown with a separate memory 38 that is used to store the decoding algorithm. Microprocessor 36 controls the state of inverting/non-inverting amplifier 34 (i.e. whether it inverts the frames of video or not) by instructing it as to which of the mode signals M1, M2 is true and should be responded to. The output of inverting/non-inverting amplifier 34 comprises the descrambled, i.e. inverted as required, video which is supplied to a modulator 40. Modulator 40 modulates the descrambled video on channel 3 or 4 and supplies it to a conventional television receiver 42.

In general operation, the M1 mode signal may comprise a "white" flag on one of the horizontal lines, e.g. line 20 of the VBI. The mode signal M2 may comprise encoded data on another one or more lines of the VBI. The encoded control byte is supplied for limited time periods by the cable head-end. The decoding algorithm for the encoded control byte is supplied to the various subscriber station decoders on a less frequent basis, depending upon the degree of security desired by the cable system operator. In the receiver, the M1 and M2 mode signals are applied to the inverting/non-inverting amplifier 34 along with the "scrambled" video. The inverting/non-inverting amplifier 34 does not know whether the "scrambled" video is to be inverted or not inverted since it does not know which of the two mode signals M1, M2 is controlling. That information is included in the encoded control byte which is supplied to the microprocessor 36 which decodes the information based upon the downloaded (out-of-band) decoding algorithm. Microprocessor 36 supplies a signal to inverting/non-inverting amplifier 34 that tells it whether to respond to mode signal M1 or mode signal M2. Thus inverting/non-inverting amplifier 34 is controlled to decode (invert when required) the scrambled video signal to effect descrambling.

Figure 3:
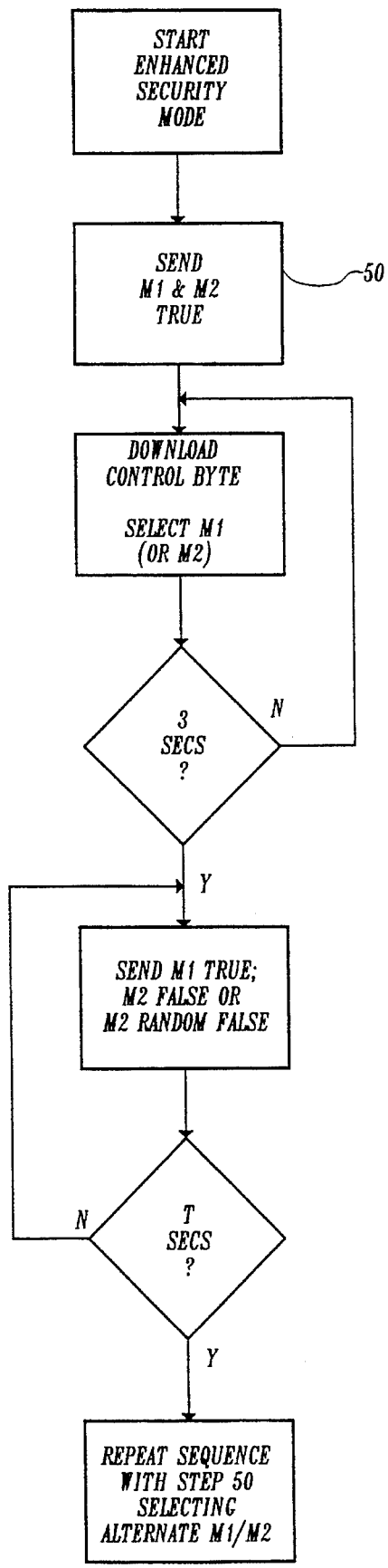
FIG. 3 is a flow chart illustrating operation of the invention.

The flow chart of FIG. 3 illustrates operation of the invention. Enhanced security in the SSAVI system is initiated by the cable head-end first by selecting both the M1 and M2 mode signals to be correct or true for operating the inverting/non-inverting amplifier in subscriber station decoders. Thus a subscriber station that is set up to respond to M1 or to M2 will properly decode the transmitted signal. At some point, the cable head-end will download the encoded control byte, which indicates whether mode signal M1 or mode signal M2 should be used to control the inverting amplifier, to the subscriber stations via in-band data. (Prior to this, either M1 or M2 gave the proper result.) In the flow chart, M1 is selected. Downloading of this information is continued for a period of time (in the preferred embodiment, three seconds) to assure that all cable subscriber stations have the proper information for selecting the appropriate mode signal. After downloading the control byte, the head-end will (for example) determine mode signal M1 to be true and mode signal M2 to be false. (Mode signal M2 may either be indicated as false on a steady basis or on a random basis.) This is continued for a period of time, illustrated as T seconds. The actual time period may be 5, 10 or 15 seconds, or the amount of time the cable head-end desires. During this time, a properly authorized subscriber station decoder will follow all transitions of the mode signals and properly invert (or not invert) the scrambled video signal. A pirate decoder or an unauthorized subscriber station decoder will however not be capable of following the transitions in the mode signals, with the result being a distorted and unviewable picture. Thereafter, the sequence may be repeated with step 50, but selecting the other one of mode signals M1 and M2. While not illustrated in the flow chart, the cable head-end may periodically download (out-of-band) a new decryption algorithm to authorized subscriber stations to preclude illegal decoders from decoding and locking on to the decoding algorithm.

The flexibility of the above system is apparent. Should unauthorized decoder boxes exist that are set up to react to either one of the mode signals M1, M2 in the vertical blanking interval, they will be defeated by the random changing of the effective mode signal to control the inverting/non-inverting amplifier. Occasionally, both mode signals are made correct and proper inversion of the video signal is accomplished, although for a short time period, e.g. during transitions of the encoded control data and during changes of the decoding algorithm.

It is recognized that numerous changes in the described embodiment of the invention will be apparent to those skilled in the art without departing from its true spirit and scope. The invention is to be limited only as defined in the claims.

What is claimed is:

1. A method of operating a cable television plant including a cable head-end and a plurality of subscriber terminals, each of said subscriber terminals having single mode signal descrambling means that is either ON or OFF and microprocessor control means comprising:

transmitting a scrambled television signal including a first and a second mode signal therein to said subscriber terminals;

transmitting an encoded mode control signal in said scrambled television signal to said subscriber terminals;

supplying said encoded mode control signal to said microprocessor control means for decoding;

supplying said first and said second mode signals to said signal descrambling means; and turning said signal descrambling means ON and OFF responsive to said first and said second mode signals as validated by said encoded mode control signal.

2. The method of claim 1 further comprising supplying a mode control signal decoding algorithm to said microprocessor control means from said cable head-end.

3. The method of claim 2 wherein said mode control signal decoding algorithm is sent apart from said scrambled television signal.

4. The method of claim 3 further comprising periodically changing said encoded control signal to validate said first mode and said second mode signals.

5. A method of operating a cable television plant including a cable head-end and a plurality of subscriber terminals, each of said subscriber terminals having single mode signal descrambling means that is either ON or OFF and microprocessor control means comprising:

transmitting a scrambled television signal including a first and a second mode signal therein to said subscriber terminals;

transmitting an encoded mode control signal in said scrambled television signal to said subscriber terminals;

transmitting, apart from said scrambled television signal, a mode control signal decoding algorithm to said microprocessor control means from said cable head-end;

supplying said encoded mode control signal to said microprocessor control means for decoding;

supplying said first and said second mode signals to said signal descrambling means;

turning said signal descrambling means ON and OFF responsive to said first and said second mode signals as validated by said encoded mode control signal; and periodically changing said encoded control signal to validate said first mode and said second mode signals.

6. A cable television system comprising:

in a transmitter;

a source of video information;

means for selectively inverting the video information from said source;

means for supplying a first mode signal and a second mode signal indicative of the inversion/non-inversion of said video information;

means for supplying an encoded mode control signal for validating one of the first mode and said second mode signals;

means for multiplexing said video information, said first mode and said second mode signals and said encoded mode control signal and transmitting a multiplexed signal to subscriber stations;

means for providing a decoding algorithm for said encoded mode control signal apart from said multiplexed signal;

in a receiver;

means for receiving said multiplexed signal and supplying said first mode and said second mode signals to an inverting/non-inverting amplifier;

a microprocessing means;

means for supplying said decoding algorithm to said microprocessing means;

means for decoding said encoded mode control signal in said microprocessing means; and means responsive to decoding of said encoded mode control signal for validating said first mode or said second mode signal for controlling said inverting/non-inverting amplifier to invert or not invert the received video information.

7. The system of claim 6 wherein said encoded mode control signal comprises a byte of information.

8. The system of claim 7 wherein said first mode signal comprises a flag in the vertical blanking interval of a television signal, and said second mode signal is encoded in said vertical blanking interval.

* * * * *